US012582085B1

(12) United States Patent
Qiu

(10) Patent No.: US 12,582,085 B1
(45) Date of Patent: Mar. 24, 2026

(54) CAT LITTER BOX WITH A GUIDE ASSEMBLY FOR COUNTERCLOCKWISE AND CLOCKWISE DISCHARGE

(71) Applicant: Jiangsu Wellspring PET Articles Co., Ltd., Jiangsu (CN)

(72) Inventor: Bin Qiu, Jiangsu (CN)

(73) Assignee: Jiangsu Wellspring PET Articles Co., Ltd., Jiangsu (CN)

( * ) Notice: Subject to any disclaimer, the term of this patent is extended or adjusted under 35 U.S.C. 154(b) by 0 days.

(21) Appl. No.: 19/026,608

(22) Filed: Jan. 17, 2025

(30) Foreign Application Priority Data

Sep. 26, 2024 (CN) .......................... 202411353976.7

(51) Int. Cl.
*A01K 1/01* (2006.01)
(52) U.S. Cl.
CPC ............ *A01K 1/011* (2013.01); *A01K 1/0114* (2013.01)
(58) Field of Classification Search
CPC ..... A01K 1/011; A01K 1/0114; A01K 1/0107
USPC ................................................ 119/165, 166
See application file for complete search history.

(56) References Cited

U.S. PATENT DOCUMENTS

| 5,048,464 | A | * | 9/1991 | Shirley | ................ | A01K 1/0114 |
| | | | | | | 209/362 |
| 5,509,379 | A | * | 4/1996 | Hoeschen | ............ | A01K 1/0114 |
| | | | | | | 209/288 |
| 2008/0017123 | A1 | * | 1/2008 | Chin | ...................... | A01K 1/011 |
| | | | | | | 119/166 |
| 2020/0060221 | A1 | * | 2/2020 | Fan | ....................... | A01K 1/0114 |
| 2022/0125006 | A1 | * | 4/2022 | Smith | .................. | A01K 1/0114 |

FOREIGN PATENT DOCUMENTS

CN 220023816 U * 11/2023

* cited by examiner

*Primary Examiner* — Zoe Tam Tran
(74) *Attorney, Agent, or Firm* — JCIPRNET

(57) ABSTRACT

The invention relates to the field of pet products, and specifically to a cat litter box. The cat litter box includes: a base; a shell rotatably connected to the base, a first accommodating cavity is provided in the shell, and an entrance in communication with the first accommodating cavity is formed on one side of the shell; a discharge port, where the discharge port is formed on an outer wall of the shell; a connecting block, where the connecting block is fixedly connected to an inner wall of the first accommodating cavity; a filter assembly, where the filter assembly is arranged in the first accommodating cavity and is connected to a first side of the connecting block; and a guide assembly, where the guide assembly is arranged in the first accommodating cavity, is connected to a second side of the connecting block, and is in communication with the discharge port.

5 Claims, 9 Drawing Sheets

CAT LITTER BOX WITH A GUIDE ASSEMBLY FOR COUNTERCLOCKWISE AND CLOCKWISE DISCHARGE

CROSS-REFERENCE TO RELATED APPLICATION

This application claims the priority benefit of China application serial no. 202411353976.7 filed on Sep. 26, 2024. The entirety of the above-mentioned patent application is hereby incorporated by reference herein and made a part of this specification.

TECHNICAL FIELD

The present invention relates to the field of pet products, and specifically to a cat litter box.

RELATED ART

Although cats are quite independent animals, proper care and attention need to be given to make cats healthy and lively. Cats instinctively dig in sand or dirt to hide or cover their urine or feces. Nowadays, urban people live in buildings, and they have to prepare cat litter boxes for cats.

A cat litter box typically includes a bottom bowl and a top cover. Cat litter made of, for example, bentonite, is usually placed in the bottom bowl for cats to defecate on it. When the excrement of cats accumulates to a certain amount, the cat litter will form clumps, which need to be removed with a shovel. However, such a conventional excrement removal method is inefficient.

SUMMARY OF INVENTION

To solve the technical problem of low efficiency of conventional excrement removal methods, an objective of the present invention is to provide a cat litter box.

To achieve the above objective, an embodiment of the present invention provides a cat litter box, including: a base; a shell, where the shell is rotatably connected to the base, a first accommodating cavity is provided in the shell, and an entrance in communication with the first accommodating cavity is formed on one side of the shell; a discharge port, where the discharge port is formed on an outer wall of the shell; a connecting block, where the connecting block is fixedly connected to an inner wall of the first accommodating cavity; a filter assembly, where the filter assembly is arranged in the first accommodating cavity and is connected to a first side of the connecting block; and a guide assembly, where the guide assembly is arranged in the first accommodating cavity, is connected to a second side of the connecting block, and is in communication with the discharge port.

The inner wall of the first accommodating cavity is fixedly connected with the connecting block, and he filter assembly and the guide assembly are both connected to a side of the connecting block adjacent to a center of the first accommodating cavity, so that a clearance is formed between the filter assembly and the inner wall of the first accommodating cavity and a clearance is formed between the guide assembly and the inner wall of the first accommodating cavity. The clearance between the filter assembly and the inner wall of the first accommodating cavity can be used for storing cat litter. The clearance between the guide assembly and the inner wall of the first accommodating cavity can provide a sliding space for excrement. The cat litter and the excrement can be separated by the filter assembly, and the excrement can be conveyed to the discharge port by the guide assembly. This process does not require the use of a shovel, and the separation of the cat litter and the excrement can be completed by rotating the shell counterclockwise and clockwise. The operation process is simple and convenient, so the excrement removal efficiency is greatly improved.

In addition, the cat litter box according to the embodiment of the present invention may further have the following additional technical features.

In the above technical solution, a connecting groove is formed on a surface of the base, a roller is rotatably connected to an interior of the connecting groove, and the shell is rotatably connected to the interior of the connecting groove.

Since the connecting groove is formed on the surface of the base, and the roller is rotatably connected to the interior of the connecting groove, when the excrement inside the shell needs to be removed, operation personnel rotates the shell. When the shell rotates, the roller is in rolling connection with the shell, so that the difficulty in rotating the shell can be reduced and the friction between the shell and the base can be reduced.

In the above technical solution, the filter assembly includes: a filter plate, where a first end of the filter plate is connected to the inner wall of the first accommodating cavity; and a first baffle plate, where a first end of the first baffle plate is connected to a second end of the filter plate, and a second end of the first baffle plate is connected to the first side of the connecting block; where a second accommodating cavity is defined by the filter plate, the first baffle plate, the connecting block, and the inner wall of the first accommodating cavity.

The filter plate, the first baffle plate, and the connecting block are arranged inside the first accommodating cavity, so that the second accommodating cavity is defined by the filter plate, the first baffle plate, the connecting block, and the inner wall of the first accommodating cavity. Therefore, when the shell is rotated counterclockwise, the excrement stays on the filter plate and the cat litter enters the second accommodating cavity. The use of a shovel is not required, and the separation of the cat litter and the excrement can be completed by rotating the shell counterclockwise, so that the difficulty of user operation is reduced and the efficiency of separating the cat litter from the excrement is improved.

In the above technical solution, an angle between the first baffle plate and the first side of the connecting block adjacent to the first baffle plate is greater than 100°.

Configuring the angle between the first baffle plate and the first side of the connecting block adjacent to the first baffle plate to be greater than 100° can increase the space of the second accommodating cavity and the space defined by the first baffle plate, the connecting block, and the first accommodating cavity. As such, when the shell is rotated counterclockwise, the cat litter does not leak out from the filter plate, thereby preventing the cat litter from being discharged from the discharge port together with the excrement.

In the above technical solution, the guide assembly includes: a guide surface, where the guide surface is arranged on the second side of the connecting block away from the first baffle plate, and a distance between the guide surface and the first baffle plate gradually decreases in a direction away from the entrance along the shell; a first guide plate, where the first guide plate is fixedly connected to a side of the guide surface adjacent to a center of the first accommodating cavity, and a shape of a side of the first guide plate adjacent to the guide surface matches a shape of the guide surface; and a second guide plate, where a first end of the second guide plate is fixedly connected to an end of the first guide plate away from the entrance, a second end of the second guide plate is connected to the discharge port, and a clearance is defined between the first end of the second guide plate adjacent to the entrance and the inner wall of the first accommodating cavity.

Because the clearance is defined between the end of the second guide plate adjacent to the entrance and the inner wall of the first accommodating cavity, when the shell continues to be rotated counterclockwise, the excrement enters the clearance. The first guide plate is fixedly connected at the guide surface, and the second guide plate is fixedly connected at the end of the first guide plate away from the entrance. Therefore, when the excrement enters the clearance, rotating the shell clockwise can cause the excrement to be discharged out of the discharge port along the first guide plate and the second guide plate, thereby removing the excrement. This process does not require the use of a shovel, and the collection of excrement can be completed by rotating the shell counterclockwise and clockwise, so the excrement removal efficiency is greatly improved.

In the above technical solution, a second baffle plate is fixedly connected between the second guide plate and the inner wall of the first accommodating cavity.

The second baffle plate is fixedly connected between the second guide plate and the inner wall of the first accommodating cavity. Thus, the second baffle plate can limit the excrement, to prevent the excrement from sliding out from one side of the second guide plate, and ensure that the excrement can slide along the second guide plate to the discharge port and be discharged out of the shell.

In the above technical solution, a first end of a third guide plate is fixedly connected to the first guide plate, a second end of the third guide plate is connected to an end of the guide surface adjacent to the entrance, and an angle between the first guide plate and a side of the third guide plate adjacent to the second guide plate is greater than 90° and less than 180°.

The first guide plate is fixedly connected to the first end of the third guide plate, and the second end of the third guide plate is connected to the end of the guide surface adjacent to the entrance, so that when the excrement slides to the end of the first guide plate away from the entrance, the excrement slides onto the third guide plate under the action of inertia. Because the angle between the first guide plate and the side of the third guide plate adjacent to the second guide plate is greater than 90° and less than 180°, the excrement slides onto the second guide plate under gravity, and then slides out of the discharge port along the second guide plate under gravity. The arrangement of the third guide plate ensures that the excrement can be smoothly discharged out of the shell, to prevent the excrement from being stuck in a gap between the shell and the end of the first guide plate away from the entrance.

In the above technical solution, a collection tank is arranged on a side of the base adjacent to the discharge port.

With the arrangement of the collection tank on the side of the base adjacent to the discharge port, the excrement discharged from the discharge port can fall into the collection tank, thereby reducing the collection difficulty for the user.

Additional aspects and advantages of the present invention will be apparent from the description below, or understood through practice of the present invention.

BRIEF DESCRIPTION OF DRAWINGS

The above and/or other additional aspects and advantages of the present invention become apparent and comprehensible from the description of embodiments in connection with accompanying drawings, in which:

In FIG. 1 to FIG. 9, the reference numerals respectively represent:

Figure 1:
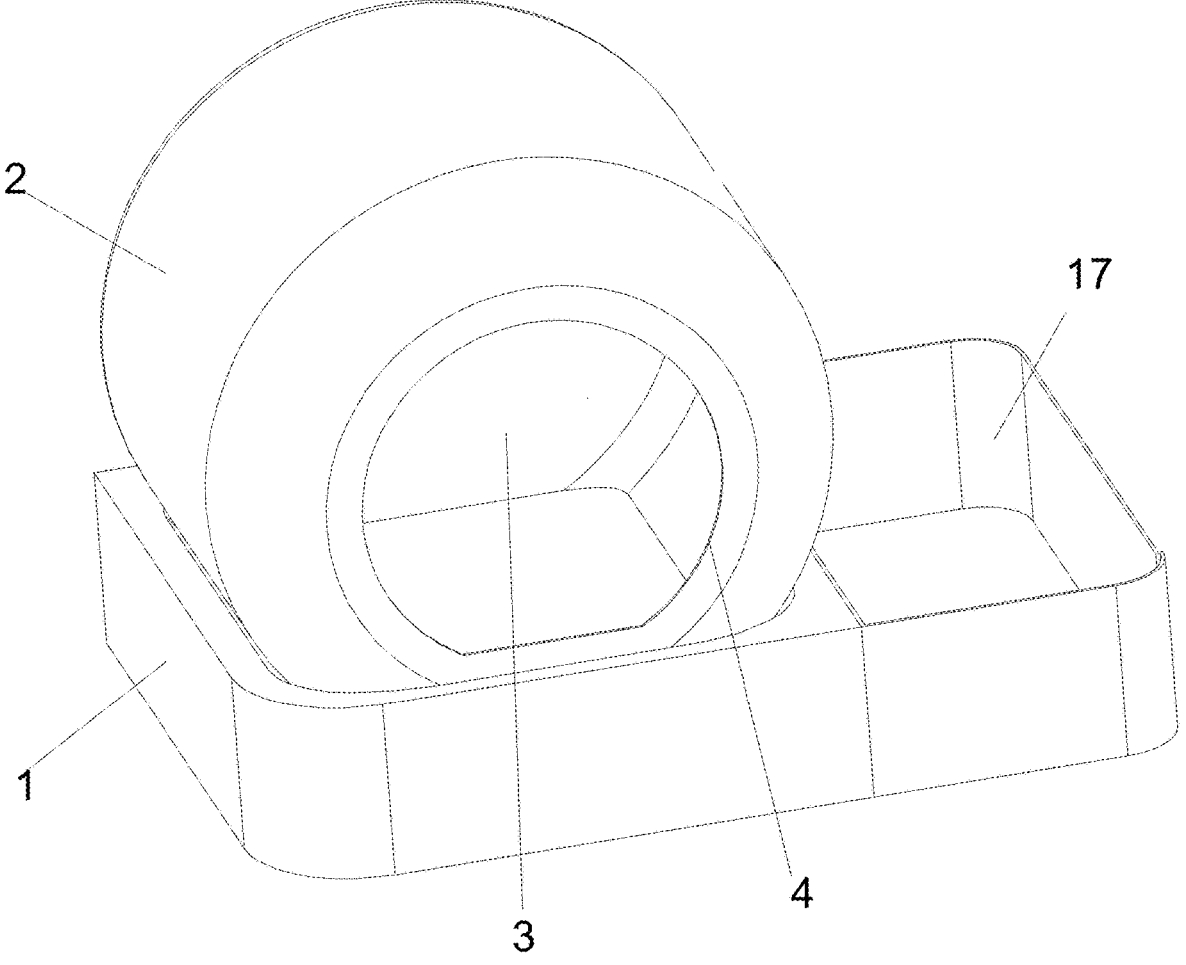
FIG. 1 is a schematic structural view of a cat litter box according to an embodiment of the present invention.

1. base; 2. shell; 3. first accommodating cavity; 4. entrance; 5. discharge port; 6. connecting block; 7. connecting groove; 8. roller; 9. filter plate; 10. first baffle plate; 11. guide surface; 12. first guide plate; 13. second guide plate; 14. clearance; 15. second baffle plate; 16. third guide plate; 17. collection tank; 18. second accommodating cavity.

DESCRIPTION OF EMBODIMENTS

To make the objectives, features, and advantages of the present invention more comprehensible, the present invention will be described in detail below with reference to the accompanying drawings and specific embodiments. It should be noted that the embodiments of the present invention and the features in the embodiments may be combined with each other without conflict.

Many specific details are set forth in the following description to provide a full understanding of the present invention. However, the present invention can also be implemented in other ways different from those described herein, so the scope of protection of the present invention is not limited by the specific embodiments disclosed below.

A cat litter box according to some embodiments of the present invention will be described below with reference to FIG. 1 to FIG. 9.

As shown in FIG. 1 to FIG. 9, an embodiment of the present invention provides a cat litter box, which includes a base 1, a shell 2, a first accommodating cavity 3, a discharge port 5, an entrance 4, a connecting block 6, a filter assembly, and a guide assembly.

Specifically, the shell 2 is rotatably connected to the base 1. The first accommodating cavity 3 is provided in the shell 2. The entrance 4 is in communication with the first accommodating cavity 3 and is formed on one side of the shell 2. The discharge port 5 is formed on an outer wall of the shell 2. The connecting block 6 is fixedly connected to an inner wall of the first accommodating cavity 3. The filter assembly is arranged in the first accommodating cavity 3 and is connected to a first side of the connecting block 6. The guide assembly is arranged in the first accommodating cavity 3, is connected to a second side of the connecting block 6, and is in communication with the discharge port 5.

According to the cat litter box provided by the embodiment of the present invention, after a cat enters the first accommodating cavity 3 from the entrance 4 formed on the side of the shell 2 and in communication with the first accommodating cavity 3 and defecates. The excrement needs to be removed. In an initial state, the filter assembly of the shell 2 is located on a side of the first accommodating cavity 3 away from a collection tank 17, cat litter is located at a bottom of the first accommodating cavity 3, and the guide assembly is located at a top of the first accommodating cavity 3. The shell 2 is rotated counterclockwise, so that the cat litter enters the filter assembly having a first end fixedly connected to the inner wall of the first accommodating cavity 3 and a second end fixedly connected to the connecting block 6, and the excrement stays on a surface of the filter assembly. Then, the shell 2 continues to be rotated counterclockwise, so that the excrement is always at the bottom of the first accommodating cavity 3 under gravity. During the counterclockwise rotation of the shell 2, the guide assembly fixedly connected to the first side of the connecting block 6 away from the filter assembly moves to the bottom of the first containing cavity 3, so that the excrement enters the guide assembly. Then, the shell 2 starts to be rotated clockwise, so that the guide assembly drives the excrement to move upward, until the excrement moves to the top of the first accommodating cavity 3. Then, the excrement falls downward along the guide assembly under gravity, until the excrement is discharged from the discharge port 5 formed on a side wall of the shell 2. After the excrement is discharged, the guide assembly returns to its initial position, and at the same time, the cat litter entering the filter assembly flows out from the filter assembly and returns to the bottom of the first accommodating cavity 3, for subsequent defecation of the cat. In the above process, a user can complete the removal of the excrement by quickly rotating the shell 2 counterclockwise and clockwise without using a shovel, so the cleaning efficiency is greatly improved. In addition, compared with conventional cat litter boxes with an open top, the arrangement of the entrance 4 on the side of the shell 2 in the present invention improves the airtightness to reduce the spread of odor.

Figure 9:
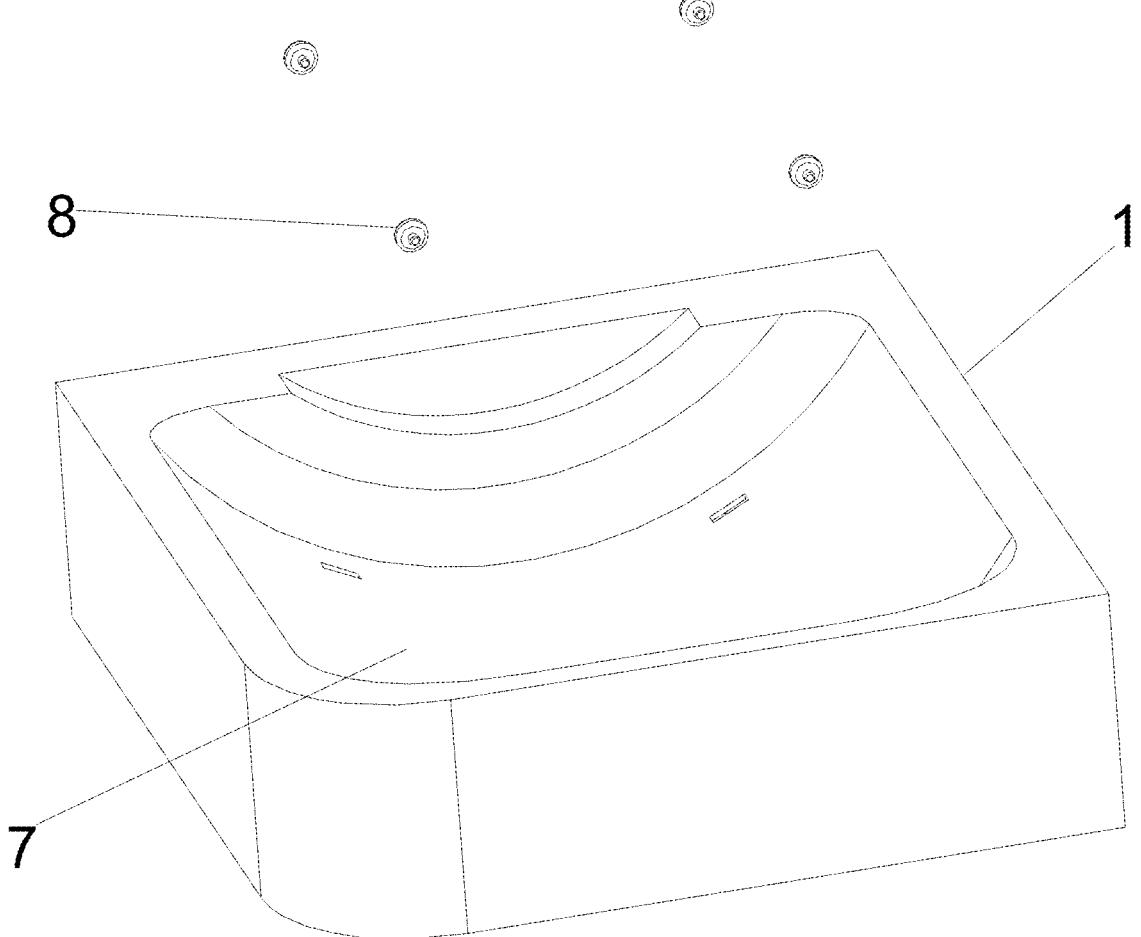
FIG. 9 is a schematic structural view of a base according to an embodiment of the present invention.

As shown in FIG. 9, in an embodiment of the present invention, a connecting groove 7 is formed on a surface of the base 1, a roller 8 is rotatably connected to an interior of the connecting groove 7, and the shell 2 is rotatably connected to the interior of the connecting groove 7.

The connecting groove 7 is formed on the surface of the base 1. The connecting groove 7 is arc-shaped. The shell 2 is cylindrical as a whole. A shape of an outer surface of the shell 2 matches a shape of the connecting groove 7. A plurality of rollers 8 are rotatably connected to a bottom of the connecting groove 7, so that when the shell 2 needs to be rotated, a rotation of the shell 2 can drive the rollers 8 to rotate. The rotation of the rollers 8 can reduce the friction between the shell 2 and the connecting groove 7, thereby reducing the difficulty in rotating the shell 2, making it more convenient for operation personnel to rotate the shell 2. In addition, the connecting groove 7 can also limit the shell 2 to prevent the position of the shell 2 from being offset.

As shown in FIG. 2 to FIG. 7, in an embodiment of the present invention, the filter assembly includes: a filter plate 9, where a first end of the filter plate 9 is connected to the inner wall of the first accommodating cavity 3; and a first baffle plate 10, where a first end of the first baffle plate 10 is connected to a second end of the filter plate 9, and a second end of the first baffle plate 10 is connected to the first side of the connecting block 6. A second accommodating cavity 18 is defined by the filter plate 9, the first baffle plate 10, the connecting block 6, and the inner wall of the first accommodating cavity 3.

The guide assembly includes: a guide surface 11, where the guide surface 11 is arranged on the second side of the connecting block 6 away from the first baffle plate 10, and a distance between the guide surface 11 and the first baffle plate 10 gradually decreases in a direction away from the entrance 4 along the shell 2; a first guide plate 12, where the first guide plate 12 is fixedly connected to a side of the guide surface 11 adjacent to a center of the first accommodating cavity 3, and a shape of a side of the first guide plate 12 adjacent to the guide surface 11 matches a shape of the guide surface 11; and a second guide plate 13, where a first end of the second guide plate 13 is fixedly connected to an end of the first guide plate 12 away from the entrance 4, a second end of the second guide plate 13 is connected to the discharge port 5, and a clearance 14 is defined between the first of the second guide plate 13 adjacent to the entrance 4 and the inner wall of the first accommodating cavity 3.

After a cat defecates, both the cat litter and the excrement are at the bottom of the first accommodating cavity 3, the filter plate 9 is located on the side of the first accommodating cavity 3 away from the collection tank 17, and the connecting block 6 is located above the filter plate 9 and above the side of the first accommodating cavity 3 away from the collection tank 17. Then, the shell 2 starts to be rotated counterclockwise, to cause the filter plate 9 to gradually move downward. Because the second accommodating cavity 18 is defined by the filter plate 9, the first baffle plate 10, the connecting block 6, and the inner wall of the first accommodating cavity 3, the cat litter and the excrement still stay at the bottom of the first accommodating cavity 3 under gravity when the filter plate 9 moves to the bottom of the first accommodating cavity 3. Through holes are provided on the filter plate 9, and sizes of the through holes are larger than the size of the cat litter and smaller than the size of the excrement, so that the cat litter can pass through the through holes and enter the second accommodating cavity 18, with the excrement being left on the filter plate 9. As such, preliminary separation of the cat litter and the excrement is achieved through the filter plate 9.

Then, the shell 2 continues to be rotated counterclockwise, to cause the filter plate 9 to move to a side of the first accommodating cavity 3 adjacent to the collection tank 17. In this case, the cat litter enters a space enclosed by the connecting block 6, the first baffle plate 10, and the first accommodating cavity 3 and therefore will not leak out from the filter plate 9, and at the same time, the connecting block 6 moves from above the side of the first accommodating cavity 3 away from the collection tank 17 to the bottom of the first accommodating cavity 3.

After the connecting block 6 moves to the bottom of the first accommodating cavity 3, the excrement falls into the clearance 14 between the end of the second guide plate 13 adjacent to the entrance 4 and the inner wall of the first accommodating cavity 3 when the clearance 14 moves to the bottom of the first accommodating cavity 3. Because the guide surface 11 is formed on the second side of the connecting block 6 away from the first baffle plate 10, the distance between the guide surface 11 and the first baffle plate 10 gradually decreases in the direction away from the entrance 4 along the shell 2, and the first guide plate 12 is fixedly connected to the side of the guide surface 11 adjacent to the center of the first accommodating cavity 3, a space is defined by the guide surface 11, the first guide plate 12, and the inner wall of the first accommodating cavity 3. The discharge port 5 is located at an end of the side wall of the shell 2 away from the entrance 4. In the initial state, the discharge port 5 is located at a side of the shell 2 adjacent to the collection tank 17. Therefore, the second guide plate 13 is fixedly connected between the discharge port 5 and the first guide plate 12, and in the initial state, the second guide plate 13 is inclined downward inside the shell 2 in a direction toward the collection tank 17.

After the excrement falls into the clearance 14, the shell 2 starts to be rotated clockwise. The excrement remains stationary under gravity. As the shell 2 continues to be rotated clockwise, the guide surface 11 pushes the excrement to move inside the shell 2 in a direction away from the collection tank 17. When the guide surface 11 gradually moves upward, because the distance between the guide surface 11 and the first baffle plate 10 gradually decreases in the direction away from the entrance 4 along the shell 2, a height of the guide surface 11 gradually decreases inside the shell 2 in the direction away from the entrance 4 during the movement of the guide surface 11 from bottom to top. Therefore, the excrement moves inside the shell 2 in the direction away from the entrance 4 along with the guide surface 11 due to the height difference of the guide surface 11. When an end of the guide surface 11 away from the entrance 4 moves to the top of the first accommodating cavity 3, the excrement comes into contact with the guide surface 11, and the first guide plate 12 supports the excrement. Then, the shell 2 continues to be rotated clockwise, so that the guide surface 11 pushes the excrement inside the shell 2 toward the collection tank 17. The first guide plate 12 is arc-shaped. Therefore, when the end of the guide surface 11 away from the entrance 4 is located at the top of the first accommodating cavity 3, a height of the first guide plate 12 gradually decreases inside the shell 2 in the direction toward the collection tank 17. Therefore, after the shell 2 continues to be rotated clockwise, the excrement slides downward along the arc of the first guide plate 12 onto the second guide plate 13. Because the second guide plate 13 is inclined downward inside the shell 2 in the direction toward the collection tank 17 in the initial state, the excrement slides downward along the second guide plate 13, until the excrement is discharged from the discharge port 5.

In addition, during the upward movement of the excrement, the filter plate 9 returns from the side of the first accommodating cavity 3 adjacent to the collection tank 17 to the side of the first accommodating cavity 3 away from the collection tank 17. In this process, the cat litter is discharged from the second accommodating cavity 18 under gravity, passes through the through holes on the filter plate 9, and returns to its initial position, i.e., the bottom of the first accommodating cavity 3, for subsequent defecation of the cat. In a conventional method, after a cat defecates, the excrement needs to be removed with a shovel, and then the cat litter also needs to be flattened with the shovel. According to the present invention, after the cat litter slides from the second accommodating cavity 18 to the bottom of the first accommodating cavity 3, the bottom of the first accommodating cavity 3 is covered with the cat litter, and there is no need to flatten the cat litter. Therefore, operation steps are further reduced.

By the above steps, the separation of the cat litter and the excrement can be completed by rotating the shell 2 counterclockwise and clockwise sequentially. The operation process is simple and convenient, so the excrement removal efficiency is greatly improved. In addition, because only the entrance 4 is formed on the shell 2, the spread of odor of the excrement can be reduced.

Figure 3:
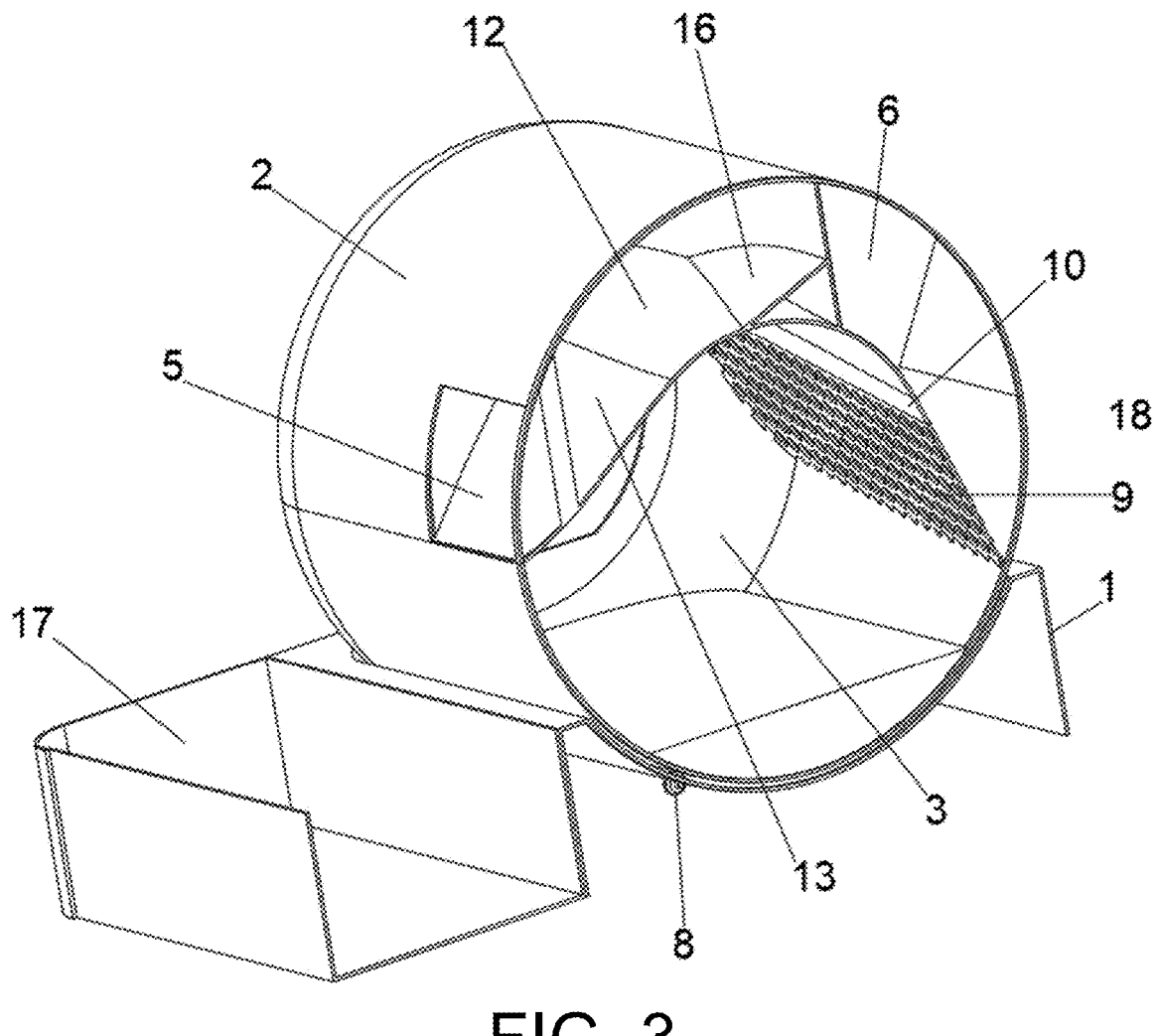
FIG. 3 is a schematic structural rear view of an interior of an embodiment of the present invention.
Figure 5:
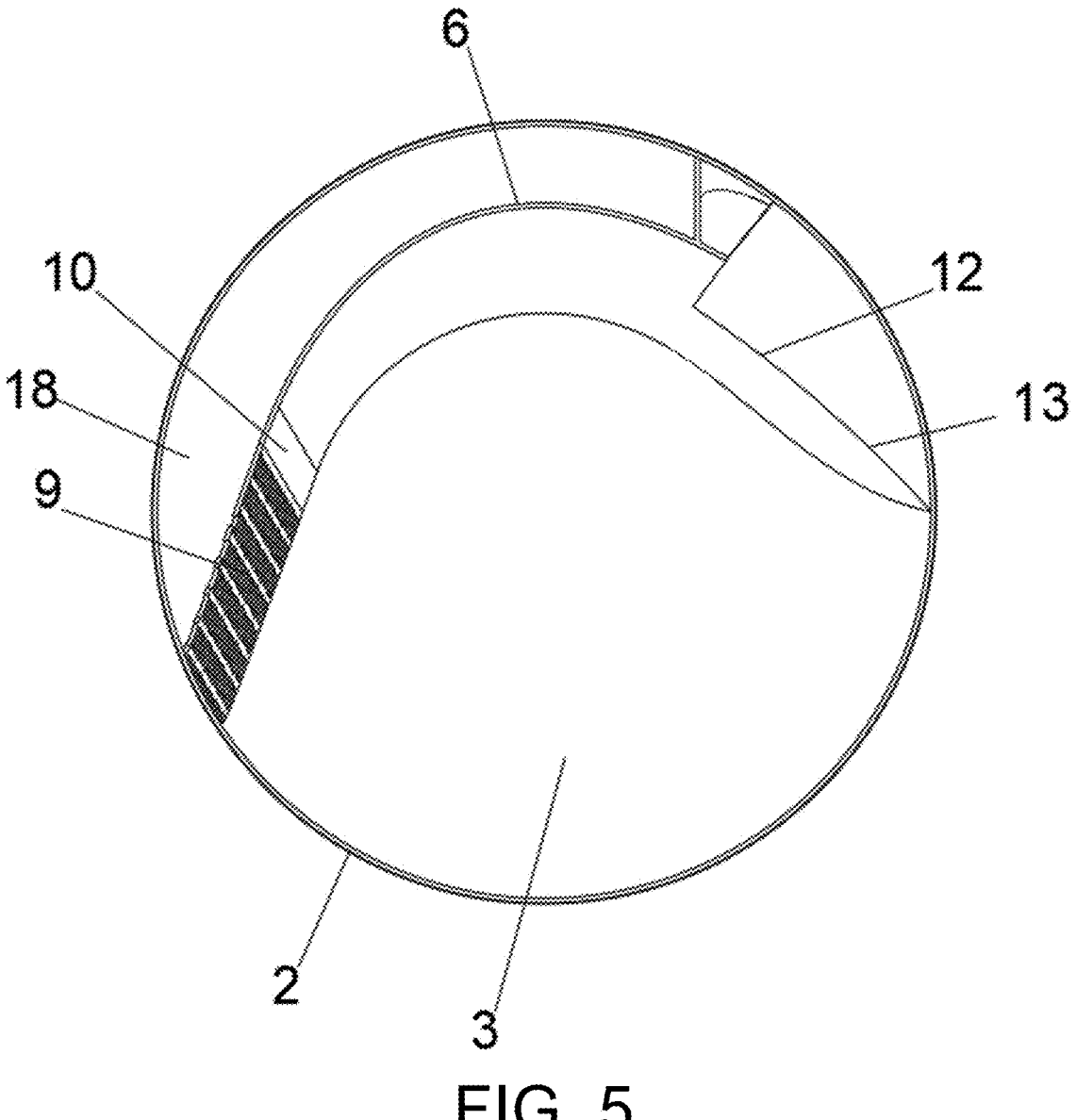
FIG. 5 is a schematic structural cross-sectional front view of a shell according to an embodiment of the present invention.
Figure 6:
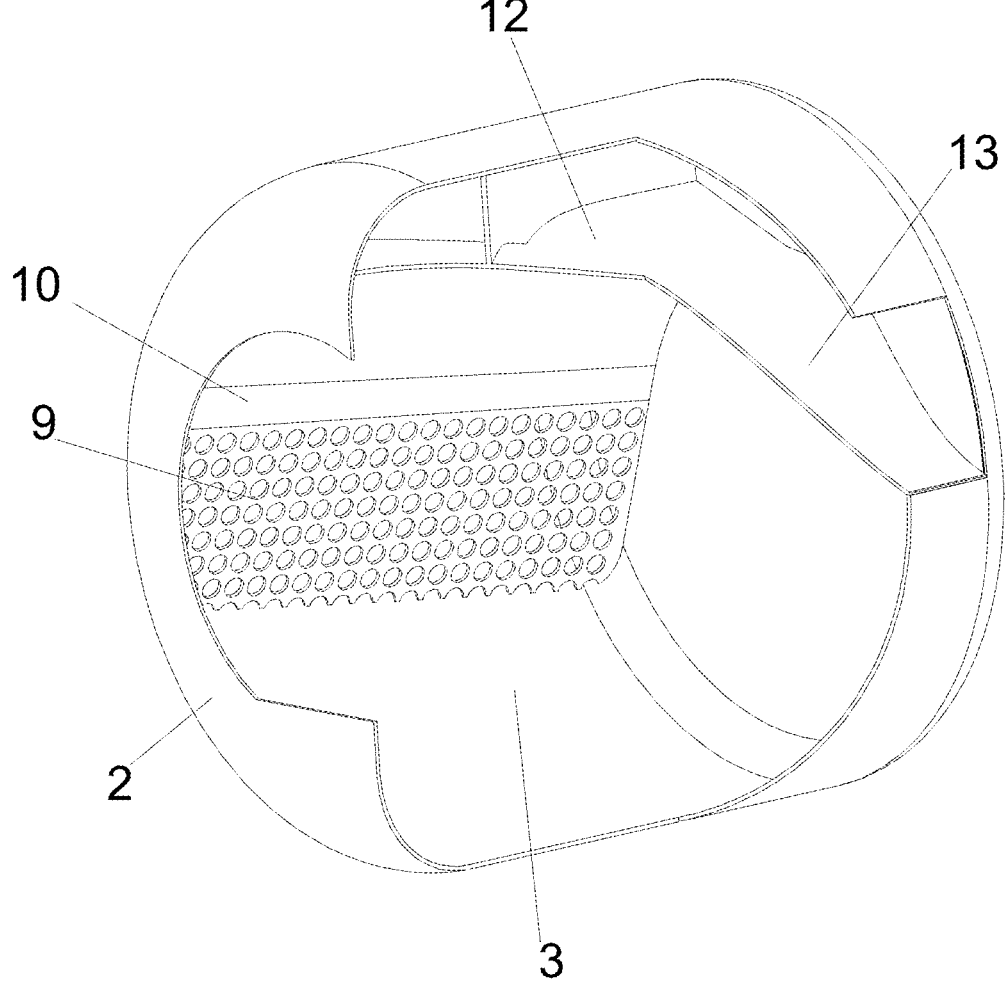
FIG. 6 is a schematic structural cross-sectional view of a shell according to an embodiment of the present invention.
Figure 7:
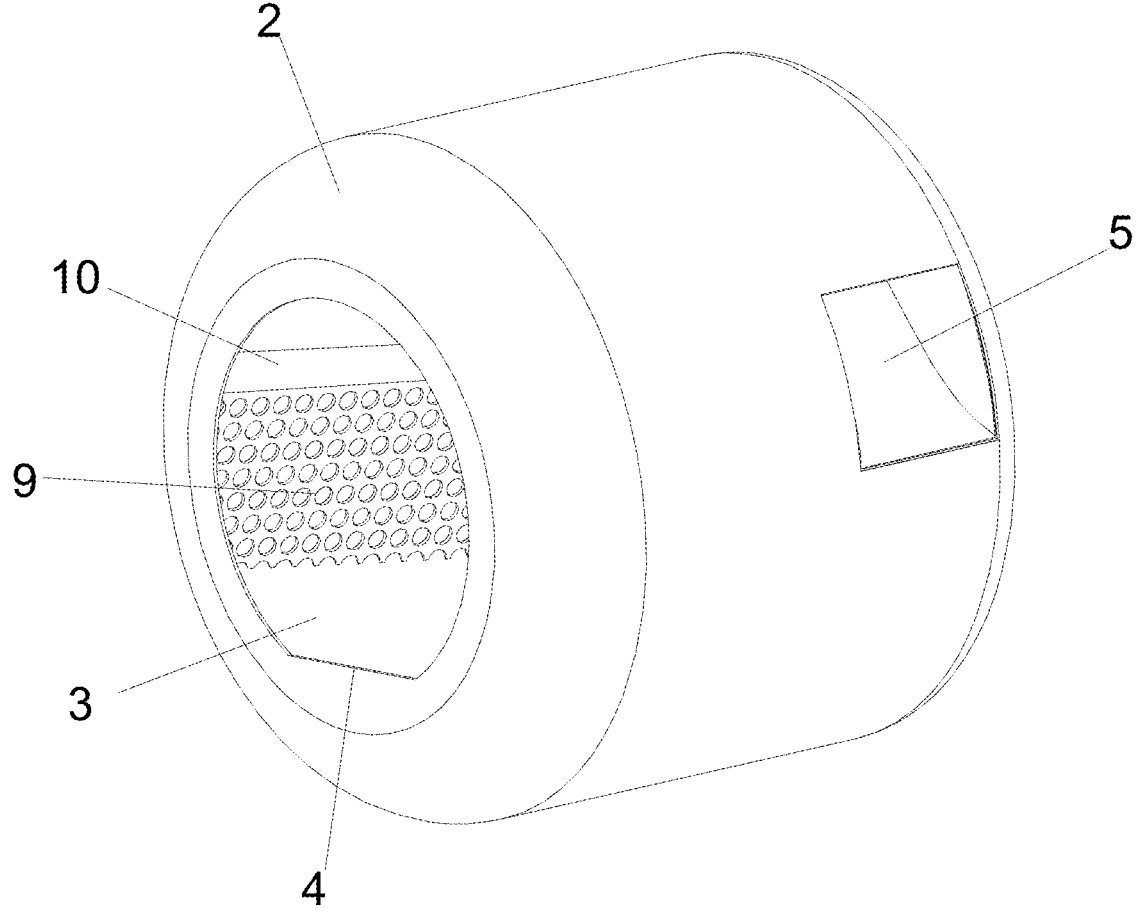
FIG. 7 is a schematic structural view of a shell according to an embodiment of the present invention.

As shown in FIG. 3, FIG. 5, and FIG. 7, in an embodiment of the present invention, an angle between the first baffle plate 10 and the first side of the connecting block 6 adjacent to the first baffle plate 10 is greater than 100°.

Configuring the angle between the first baffle plate 10 and the first side of the connecting block 6 adjacent to the first baffle plate 10 to be greater than 100° can increase the space of the second accommodating cavity 18 and the space defined by the first baffle plate 10, the connecting block 6, and the first accommodating cavity 3. As such, when the shell 2 is rotated counterclockwise, the cat litter does not leak out from the filter plate 9, thereby preventing the cat litter from being discharged from the discharge port 5 together with the excrement.

Figure 2:
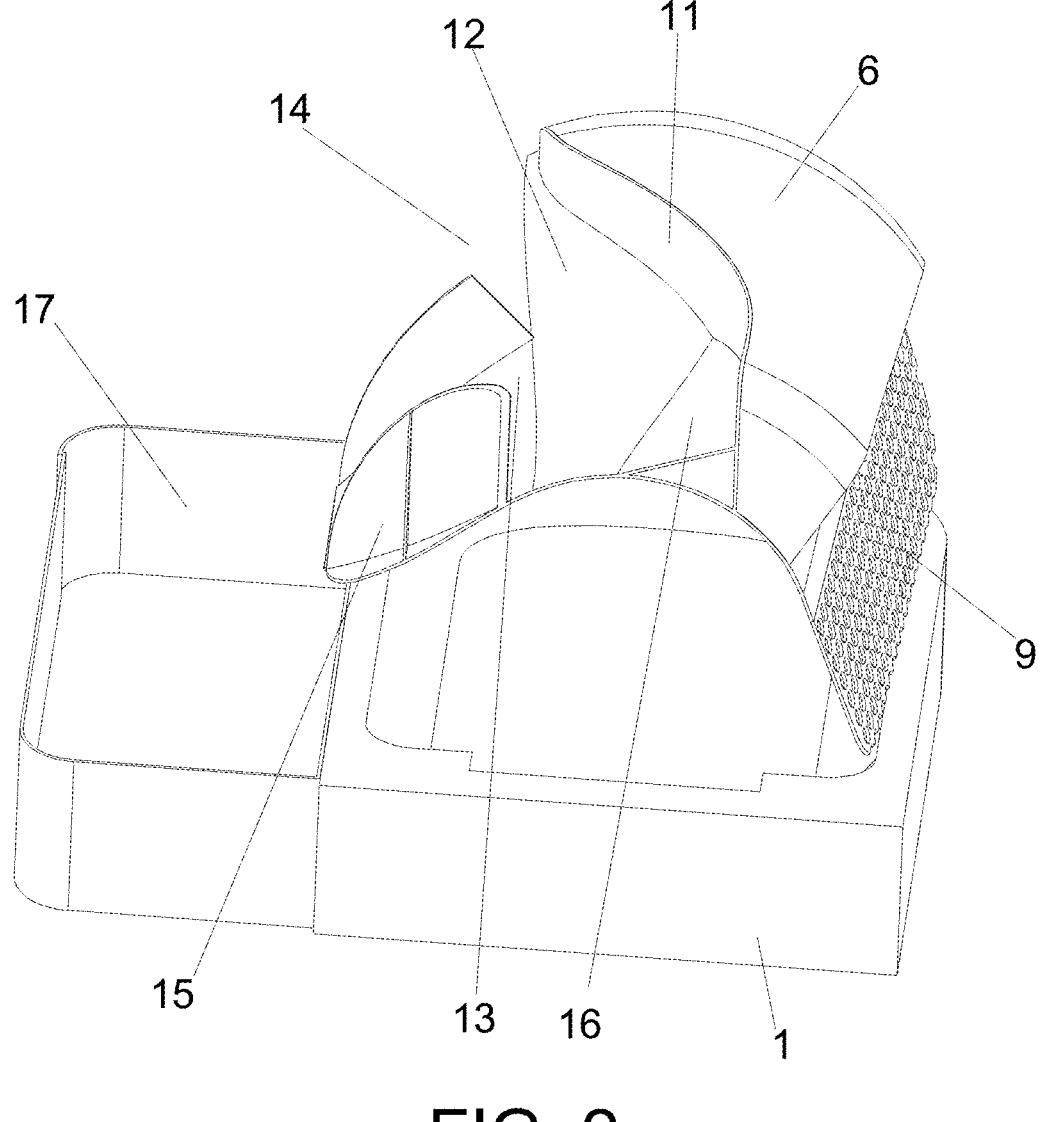
FIG. 2 is a schematic structural rear view of an interior of a shell according to an embodiment of the present invention.
Figure 4:
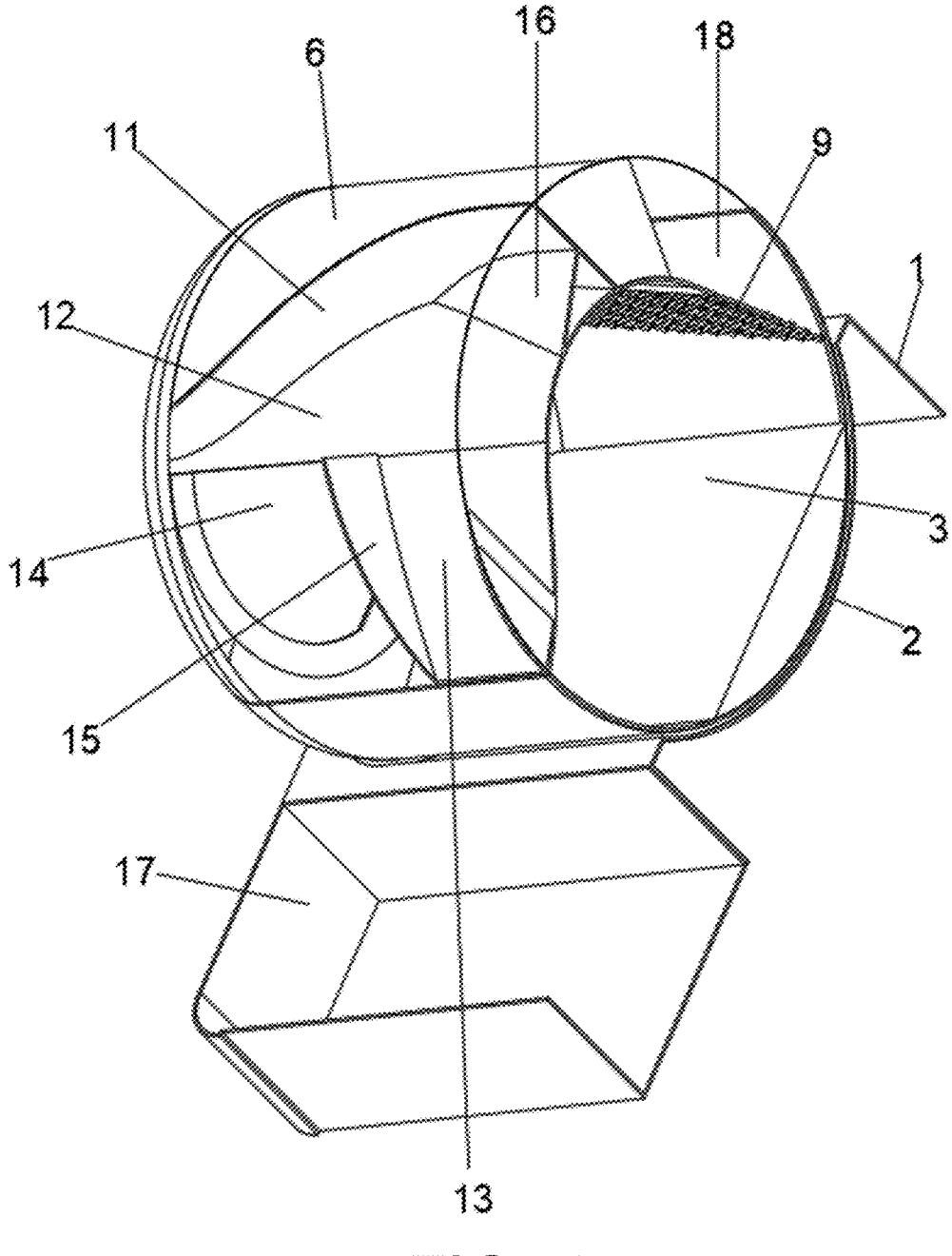
FIG. 4 is a schematic structural right view of an interior of an embodiment of the present invention.
Figure 8:
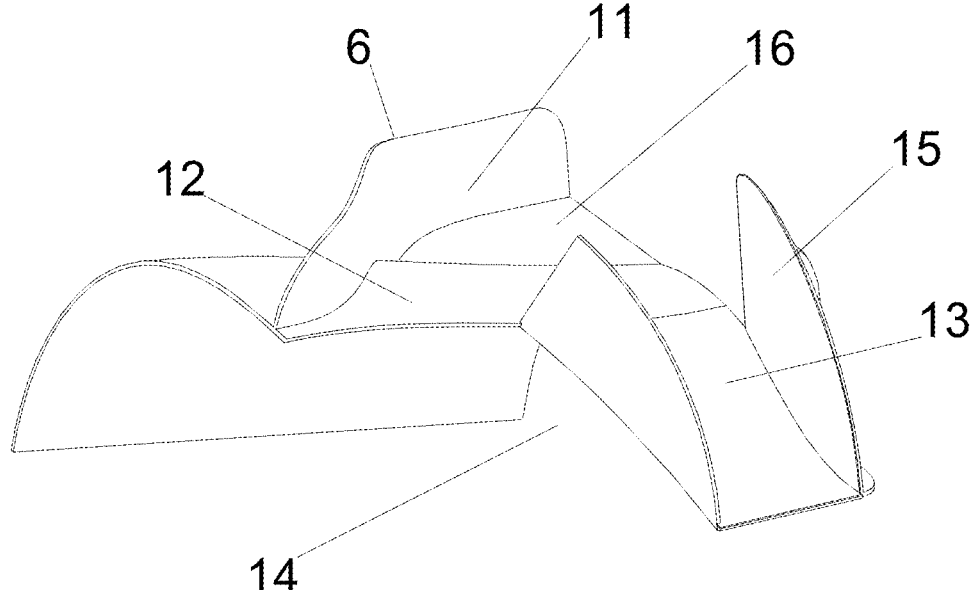
FIG. 8 is a schematic structural view of a guide assembly according to an embodiment of the present invention.

As shown in FIG. 2, FIG. 4, and FIG. 8, in an embodiment of the present invention, a second baffle plate 15 is fixedly connected between the second guide plate 13 and the inner wall of the first accommodating cavity 3.

Two second baffle plates 15 are fixedly connected between the second guide plate 13 and the inner wall of the first accommodating cavity 3, so that the excrement can only slide downward between the two second baffle plates 15. The second baffle plates 15 can limit the excrement, to prevent the excrement from sliding out from one side of the second guide plate 13, and ensure that the excrement can slide along the second guide plate 13 to the discharge port and be discharged out of the shell 2.

As shown in FIG. 2, FIG. 3, FIG. 4, and FIG. 8, in an embodiment of the present invention, the first guide plate 12 is fixedly connected to a first end of a third guide plate 16, a second end of the third guide plate 16 is connected to an end of the guide surface 11 adjacent to the entrance 4, and an angle between the first guide plate 12 and a side of the third guide plate 16 adjacent to the second guide plate 13 is greater than 90° and less than 180°.

The first guide plate 12 is fixedly connected to the first end of the third guide plate 16, and the second end of the third guide plate 16 is connected to the end of the guide surface 11 adjacent to the entrance 4, so that when the excrement slides to the end of the first guide plate 12 away from the entrance 4, the excrement slides onto the third guide plate 16 under the action of inertia. Because the angle between the first guide plate 12 and the side of the third guide plate 16 adjacent to the second guide plate 13 is greater than 90° and less than 180°, the excrement is prevented from being stuck in a gap between the shell 2 and the end of the first guide plate 12 away from the entrance 4. Therefore, the excrement slides onto the second guide plate 13 under gravity, and then slides out of the discharge port 5 along the second guide plate 13 under gravity. The arrangement of the third guide plate 16 ensures that the excrement can be smoothly discharged out of the shell 2.

As shown in FIG. 1 to FIG. 4, in an embodiment of the present invention, a collection tank 17 is arranged on a side of the base 1 adjacent to the discharge port 5.

With the arrangement of the collection tank 17 on the side of the base 1 adjacent to the discharge port 5, the excrement discharged from the discharge port 5 can fall into the collection tank 17, thereby reducing the collection difficulty for the user. A paper pad, a garbage bag, or the like may be placed in the collection tank 17. When the paper pad is used for collection, the excrement can be quickly wrapped upon falling onto the paper pad in the collection tank 17, thereby reducing the spread of odor. When the garbage bag is used for collection, the garbage bag may be directly lifted and discarded after the garbage bag is filled up with excrement.

The present invention has the following advantages.

1. The removal of excrement can be completed by rotating the shell 2 counterclockwise and clockwise sequentially, so the excrement removal efficiency is greatly improved.

2. The arrangement of the filter assembly ensures that the bottom of the first accommodating cavity 3 is always covered with cat litter, to prevent a cat from defecating on the inner wall of the first accommodating cavity 3, thereby reducing the cleaning difficulty.

In the present invention, the terms such as "mount", "connect", "couple", "fix", and variants thereof should be interpreted in a broad sense. For example, "connection" may be a fixed connection, a detachable connection, or an integral connection; and "connection" may also be a direct connection or an indirect connection through an intermediate medium. For those of ordinary skill in the art, the specific meanings of the above terms in the present invention can be understood according to specific circumstances.

In the description of the present invention, it should be understood that the orientation or positional relationships indicated by the terms such as "inner" and "outer" are based on orientation or position relationships shown in the accompanying drawings, and are used only for ease and brevity of illustration and description, rather than indicating or implying that the mentioned apparatus or unit must have a particular orientation or must be constructed and operated in a particular orientation. Therefore, such terms should not be construed as limiting of the present invention.

In the description of this specification, the description with reference to the terms such as "an embodiment", "some embodiments", and "specific embodiment" means that specific features, structures, materials, or characteristics described in connection with the embodiment or example are embraced in at least one embodiment or example of the present invention. In this specification, exemplary descriptions of the foregoing terms do not necessarily refer to the same embodiment or example. Moreover, the described specific features, structures, materials, or characteristics may be combined in any suitable manner in one or more embodiments or examples.

The above description is merely preferred embodiments of the present invention, and is not intended to limit the present invention. To those skilled in the art, various modifications and variations may be made to the present invention. Any modification, equivalent replacement, or improvement made without departing from the spirit and principle of the present invention shall fall within the scope of protection of the present invention.

What is claimed is:

1. A cat litter box, comprising:

a base;

a shell, wherein the shell is rotatably connected to the base, a first accommodating cavity is provided in the shell, and an entrance in communication with the first accommodating cavity is formed on one side of the shell;

a discharge port, wherein the discharge port is formed on an outer wall of the shell;

a connecting block, wherein the connecting block is fixedly connected to an inner wall of the first accommodating cavity;

a filter assembly, wherein the filter assembly is arranged in the first accommodating cavity and is connected to a first side of the connecting block, wherein the filter assembly has a first baffle plate, a second end of the first baffle plate is connected to the first side of the connecting block;

a guide assembly, wherein the guide assembly is arranged in the first accommodating cavity, is connected to a second side of the connecting block, and is in communication with the discharge port, wherein the guide assembly comprises:

a guide surface, wherein the guide surface is arranged on the second side of the connecting block away from the first baffle plate, and a distance between the guide surface and the first baffle plate gradually decreases in a direction away from the entrance along the shell;

a first guide plate, wherein the first guide plate is fixedly connected to a side of the guide surface adjacent to a center of the first accommodating cavity, and a shape of a side of the first guide plate adjacent to the guide surface matches a shape of the guide surface; and a second guide plate, wherein a first end of the second guide plate is fixedly connected to an end of the first guide plate away from the entrance, a second end of the second guide plate is connected to the discharge port, and a clearance is defined between the first end of the second guide plate adjacent to the entrance and the inner wall of the first accommodating cavity;

a second baffle plate, wherein the second baffle plate is fixedly connected between the second guide plate and the inner wall of the first accommodating cavity; and a third guide plate, wherein a first end of the third guide plate is fixedly connected to the first guide plate, a second end of the third guide plate is connected to an end of the guide surface adjacent to the entrance, and an angle between the first guide plate and a side of the third guide plate adjacent to the second guide plate is greater than 90° and less than 180°.

2. The cat litter box according to claim 1, wherein a connecting groove is formed on a surface of the base, a roller is rotatably connected to an interior of the connecting groove, and the shell is rotatably connected to the interior of the connecting groove.

3. The cat litter box according to claim 1, wherein the filter assembly comprises:

a filter plate, wherein a first end of the filter plate is connected to the inner wall of the first accommodating cavity; and a first end of the first baffle plate is connected to a second end of the filter plate;

wherein a second accommodating cavity is defined by the filter plate, the first baffle plate, the connecting block, and the inner wall of the first accommodating cavity.

4. The cat litter box according to claim 3, wherein an angle between the first baffle plate and the first side of the connecting block adjacent to the first baffle plate is greater than 100°.

5. The cat litter box according to claim 1, wherein a collection tank is arranged on a side of the base adjacent to the discharge port.

* * * * *